United States Patent Office 2,908,692
Patented Oct. 13, 1959

2,908,692

2,4-DITERTIARYBUTYL-4,6-DIMETHOXY-2,5-CYCLOHEXADIEN-1-ONE

Herbert B. Richert, Midland, Mich., assignor to The Dow Chemical Company, Midland, Mich., a corporation of Delaware No Drawing. Application October 4, 1957
Serial No. 688,135

2 Claims. (Cl. 260—396)

The present invention is directed to 2,4-ditertiarybutyl-4,6-dimethoxy-2,5-cyclohexadien-1-one corresponding to the formula

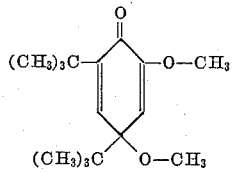

This novel compound is a crystalline solid which is soluble in many common organic solvents and of very low solubility in water. The compound is particularly valuable for the control of growth of plants and is adapted to be employed as the active toxicant in herbicide compositions. The compound is also useful as a parasiticide for the control of many undesirable insect and fungal organisms.

The new 2,4-ditertiarybutyl-4,6-dimethoxy-2,5-cyclohexadien-1-one may be prepared by reacting 2,4-ditertiarybutyl-4,6-dichloro-2,5-cyclohexadien-1-one with methanol. The reaction is carried out in the presence of an alkali metal hydroxide and conveniently in an inert organic solvent. In a preferred method, the reaction is carried out in an excess of the methanol reactant as reaction solvent. Good results are obtained when employing about one molecular proportion 2,4-ditertiarybutyl-4,6-dichloro-2,5-cyclohexadien-1-one and two molecular proportions of alkali metal hydroxide with at least two molecular proportions of methanol. The reaction is endothermic and goes forward smoothly in the temperature range of from 40° to 80° C. with the production of the desired product and alkali metal chloride of reaction. In carrying out the reaction, the 2,4-ditertiarybutyl-4,6-dichloro-2,5-cyclohexadien-1-one, methanol and alkali metal hydroxide such as sodium or potassium hydroxide are mixed together in the reaction solvent and the resulting mixture heated for a period of time at a temperature of from 40° to 80° C. Upon completion of the reaction, the desired product may be removed and purified according to well-known methods.

In a representative preparation, 55 grams (0.2 moles) of 2,4-ditertiarybutyl-4,6-dichloro-2,5-cyclohexadien-1-one and 24 grams (0.6 mole) of solid sodium hydroxide were mixed and blended together in 480 grams (15 moles) of methanol, and the resulting mixture was heated at 60° to 70° C. for 2½ hours and under reflux to carry the reaction to completion. During the reaction, byproduct sodium chloride precipitated and was thereafter removed by filtration. The filtrate was diluted with 750 milliliters of water, whereupon the resulting mixture divided into two layers. The supernatant layer, a yellow oil, was separated, and upon standing, solidified as a crystalline solid. The solid was successively washed with water and a methanol-water mixture. The washed solid was then fractionally distilled under reduced pressure to obtain a 2,4-ditertiarybutyl - 4,6 - dimethoxy-2,5-cyclohexadien-1-one product as a crystalline solid boiling at 100°–103° C. at 1 millimeter pressure and melting at 35°–38° C.

The new 2,4-ditertiarybutyl-4,6-dimethoxy-2,5-cyclohexadien-1-one is effective as an herbicide. For such use the compound may be dispersed on a finely divided solid and employed as a dust. Also, such mixtures may be dispersed in water with the aid of a wetting agent and the resulting aqueous suspensions employed as sprays. In other procedures, the products may be employed in oils, as constituents of oil-in-water or water-in-oil emulsions, or in water dispersions with or without the addition of dispersing or emulsifying agents. In a representative operation, substantially complete control of the growth of seeds and emerging seedlings of wild oats (*Avena fatua*) was obtained with 2,4 - ditertiarybutyl - 4,6-dimethoxy-2,5-cyclohexadien-1-one when this compound was applied to soil at a dosage of 50 pounds per acre.

2,4-ditertiarybutyl-4,6-dichloro-2,5-cyclohexadien-1-one employed as a starting material in the preparation of the compound of the present invention may be prepared by direct chlorination of 2,4-ditertiarybutylphenol. The reaction takes place at the temperatures in the range of from 4°–60° C. with the production of the desired product and hydrogen chloride of reaction. Upon completion of the reaction as is evidenced by the substantial cessation of hydrogen chloride evolution the reaction mixture is filtered to separate the 2,4-ditertiarybutyl-4,6-dichloro-2,5-cyclohexadien-1-one as a crystalline solid, melting at 78° C.

I claim:

1. 2,4-ditertiarybutyl-4,6-dimethoxy-2,5-cyclohexadien-1-one corresponding to the formula

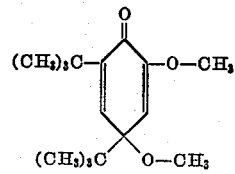

2. The method of preparation of 2,4-ditertiarybutyl-4,6-dimethoxy-2,5-cyclohexadien-1-one which comprises reacting 2,4-ditertiarybutyl-4,6 - dichloro - 2,5 - cyclohexadien-1-one with methanol in the presence of an alkali metal hydroxide.

References Cited in the file of this patent

Coppinger et al.: J. Am. Chem. Soc., vol. 75, pp. 734–736 (1953).

UNITED STATES PATENT OFFICE

CERTIFICATE OF CORRECTION

October 13, 1959

Patent No. 2,908,692

Herbert B. Rickert

It is hereby certified that error appears in the above numbered patent requiring correction and that the said Letters Patent should read as corrected below.

In the grant, line 1, and in the heading to the printed specification, line 4, name of the inventor, for "Herbert B. Richert" read -- Herbert B. Rickert --.

Signed and sealed this 26th day of April 1960.

(SEAL)
Attest:

KARL H. AXLINE
Attesting Officer

ROBERT C. WATSON
Commissioner of Patents